Feb. 9, 1932.  W. STUEBING, JR  1,844,876
LIFTING TRUCK
Original Filed Aug. 25, 1928  2 Sheets-Sheet 1
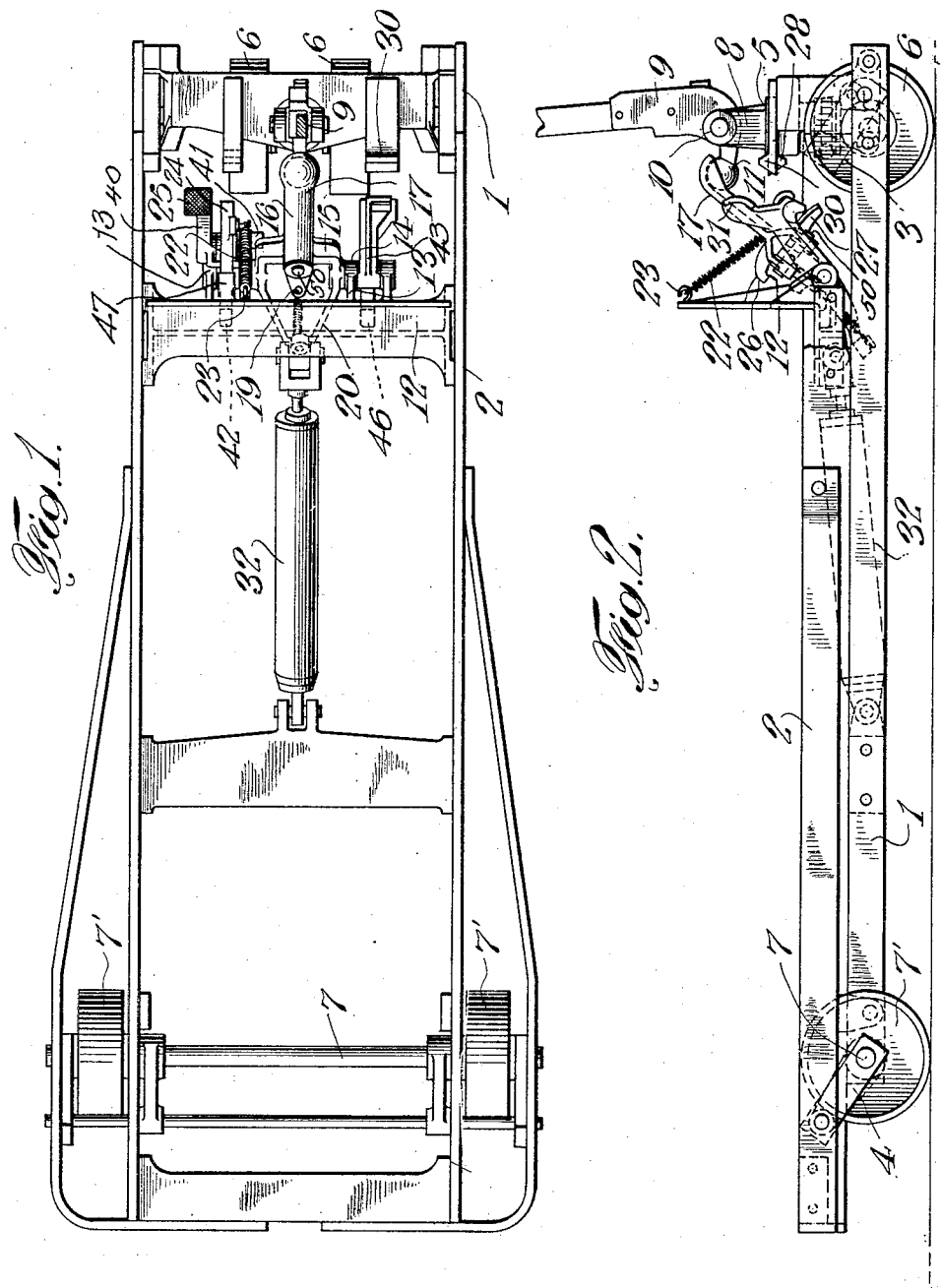
INVENTOR.
William Stuebing Jr.
BY
Emery, Booth, Janney & Varney
ATTORNEYS.

Feb. 9, 1932.  W. STUEBING, JR  1,844,876
LIFTING TRUCK
Original Filed Aug. 25, 1928   2 Sheets-Sheet 2
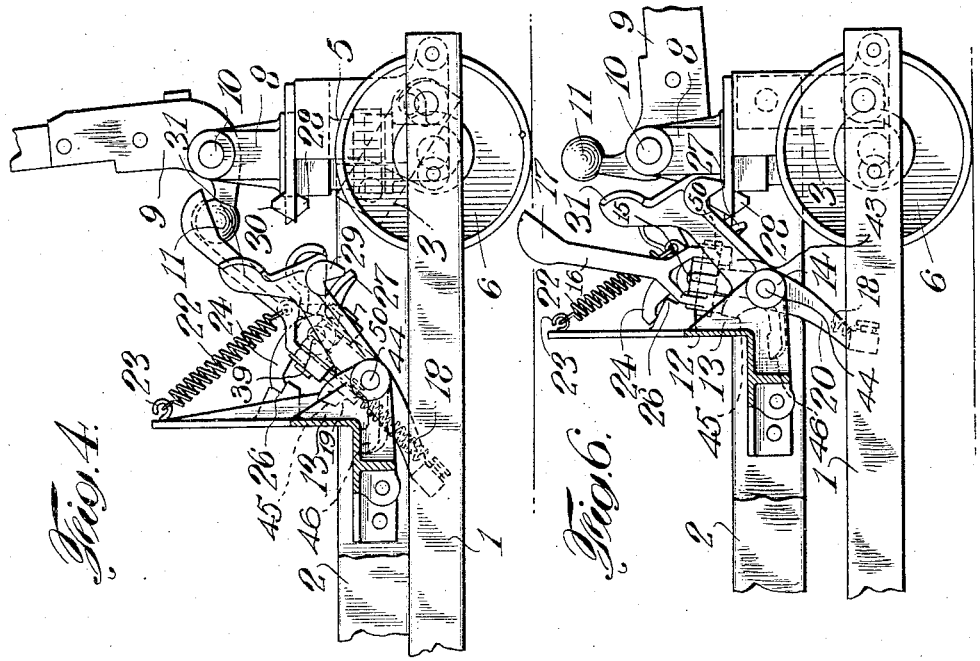
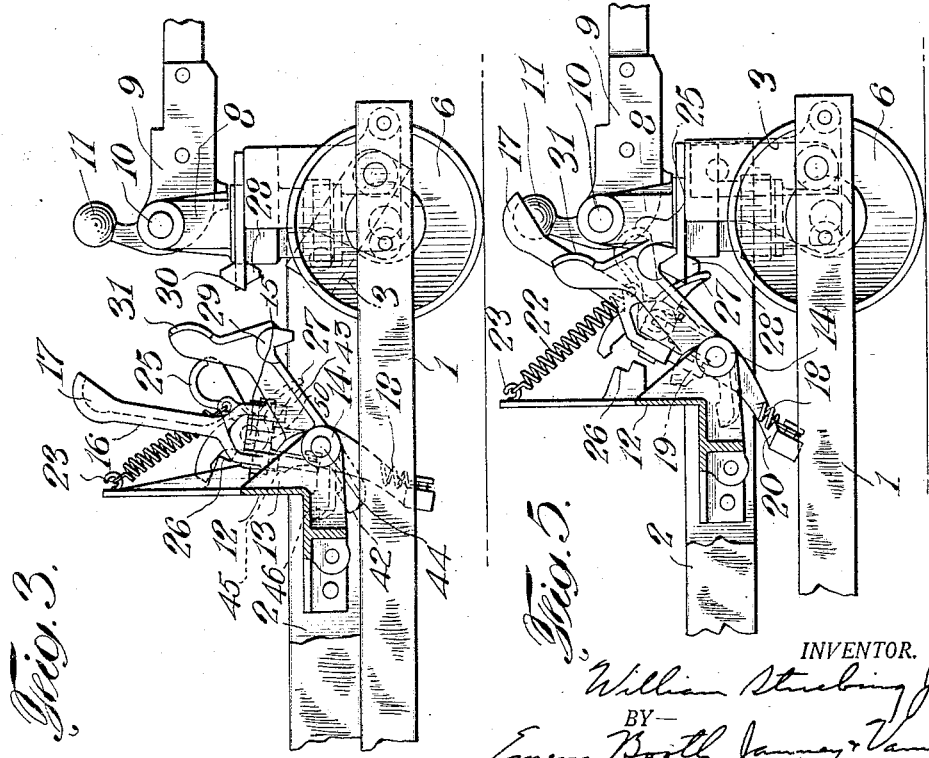
INVENTOR.
William Stuebing Jr.
BY
Emery, Booth, Janney & Varney
ATTORNEYS.

Patented Feb. 9, 1932

1,844,876

UNITED STATES PATENT OFFICE

WILLIAM STUEBING, JR., OF CINCINNATI, OHIO, ASSIGNOR, BY MESNE ASSIGNMENTS, TO THE YALE & TOWNE MANUFACTURING COMPANY, OF STAMFORD, CONNECTICUT, A CORPORATION OF CONNECTICUT

LIFTING TRUCK

Application filed August 25, 1928, Serial No. 302,001. Renewed June 13, 1931.

This invention relates to lifting trucks and pertains more particularly to trucks of the side-lift type,—that is, trucks in which the lifting operation may be accomplished when the steering tongue is moved to either side of the longitudinal center line of the truck as well as when it is located directly in the center line of the truck.

It is an object of the invention to provide a truck which shall be simple and rugged in construction and easy in operation, and one which shall incorporate certain safety features adapted to prevent accidents during use.

Other objects and advantages of the invention will appear hereinafter.

A preferred embodiment of the apparatus is illustrated in the accompanying drawings, in which, Figure 1 is a top plan view of the truck.

Figure 2 is a side elevation.

Figure 3 is an enlarged side elevation of the forward end of the truck, showing the elevating platform in its lowermost position and the lifting mechanism disengaged from the steering tongue.

Figure 4 is a similar view, showing the lifting mechanism in engagement with the steering tongue preparatory to raising the elevating frame.

Figure 5 is a similar view showing the parts at the end of the lifting operation, but with the lifting mechanism still in engagement with the steering tongue, and Figure 6 is a similar view after disengagement of said parts.

Referring to the drawings, and particularly to Figures 1 and 2, the truck comprises a main frame 1, and an elevating frame 2 pivotally connected to the main frame by means of links 3 and 4 located respectively near its front and rear ends, and adapted to permit forward and upward movement of said elevating frame with respect to said main frame.

Mounted on the forward end of the main frame is a swivelled steering head 5, the lower portion of which carries the steering wheels 6 which support the forward end of the truck, while wheels 7' mounted on the axle 7 support the rear end of the truck.

The upper end of the steering head 5 is formed to provide a fork 8 upon which is pivotally mounted a steering tongue 9, the transverse axis of the pivot 10 of said tongue preferably being so located as to intersect the vertical axis of the steering head, in order that the rearward extension of the steering tongue which terminates in the ball 11 may move in a path outside and preferably to the rear of the said vertical axis.

Rigidly mounted on the elevating frame is a cross frame 12 having forwardly extending brackets 13 terminating in journals 14 adapted to receive and support a rocking member 15, which in turn carries pivotally mounted thereon a link 16 terminating in a socket 17 adapted to fit over the ball 11.

As will be observed, the axis of the pivotal connection between the rocking member 15 and the frame and the axis of the pivotal connection 50 between the rocking member 15 and the link 16 are arranged at right angles, the former lying transversely of the truck, while the latter extends generally longitudinally thereof. In this manner a universal joint connection is provided between the steering tongue and elevating frame permitting the socket 17 to remain in engagement with the ball 11 not only when the steering tongue is operated in straight forward position but also when it is operated in positions to either side of straight forward position, thus permitting what has been called "side" or "angle lift" operation.

In order to keep the link 16 normally centered when out of engagement with ball 11 so that it may be in position for engagement therewith when it is desired to lift the elevating frame, a spring 18 is provided, one end of which is attached to the tail piece 19 of the link 16, while the other end is attached to the bail shaped portion 20 of the member 15.

The link 16, which may for convenience be called the lifting link, is normally held in its rearward substantially vertical position, as shown in Figure 3, by means of spring 22 having one end secured to the elevating frame at 23 and having its other end secured to an upward extension of the pawl 24 which is pivotally mounted at 39 on a pawl carrying lever 40 pivoted with the rocking member 15 on brackets 13. The point of connection of the spring 22 with the pawl 24 is located off the common axis of rocking member 15 and lever 40 and so that the pawl is normally urged in a counter-clockwise direction.

The lever 40 is provided with a treadle 25 at the outer side of pawl 24 and with a lug 41 at the opposite or inner side and in position to engage an under portion of member 15, Figure 1. The inner end 42 of lever 40 extends under and engages the under side of cross frame 12 to limit the extent of downward movement of treadle 25. Thus, when the said treadle 25 is depressed against the normal tension of spring 22, lug 41 moves downwardly permitting the lifting link to swing toward and into engagement with the ball 11, as illustrated in Figure 4. In this position the end of the pawl 24 is caused to engage a notch 26 formed in a bracket 47 projecting forwardly from cross frame 12 and in the path of the rearwardly extending end of pawl 24, and the lifting link is thus positively retained in engagement with the ball 11 until after the steering tongue is swung downwardly to lift the elevating frame.

During the lifting operation, and preferably near the end thereof, an extension 27 of the pawl 24 engages the cam face 28, thus disengaging the pawl from notch 26, as illustrated in Figure 5. However, the lever 40 is still held in downwardly deflected position and the lifting link 15 remains in engagement with the ball 11 as long as the steering tongue continues its lifting movement. After the lifting tongue reaches the lower position at which frame 2 becomes latched in raised position, the tongue may be swung backwardly slightly, as illustrated in Figure 6, whereupon the lifting link and associated parts swing rearwardly under the influence of the spring 22 out of engagement with the ball 11.

In the meantime, as the elevating frame approaches its uppermost position, a latch 29 forming part of a lever 43 which is pivotally mounted at 44 on the elevating frame, is caused to engage the lug 30 on the main frame, as illustrated in Figure 5, whereby when the lifting operation is completed and the lifting link disengaged, the elevating frame may be maintained in elevated position.

When it is desired to lower the elevating frame, a treadle 31 forming part of lever 43 is pressed to disengage the latch 29 and the weight of the frame or the combined weight of the frame and load causes the frame to descend. A rearwardly disposed lug 45 on lever 43 engages a forwardly disposed portion of cross frame 12 to limit the extent of rearward movement of lever 43 when pedal 31 is pushed back; and another lug 46 on the lower end of lever 43 engages an under portion of cross frame 12 to hold said lever consequently the latch 29 in the position shown in Figure 3. Preferably descent of frame 2 is controlled by means of a hydraulic check 32.

In operation, when it is desired to transport a load from one place to another, the elevating platform is permitted to descend to the position illustrated in Figure 3, and the truck is moved to position beneath a platform carrying the load which is to be moved. The steering tongue 9 is then swung upwardly to substantially vertical position, and the treadle 25 is depressed by the operator to cause the cup 17 of the lifting link 16 to engage the ball 11 as illustrated in Figure 4. As has been previously explained, depression of the treadle 25 also causes the pawl 24 to engage the notch 26 so that when the lifting link 16 is once engaged with the ball 11, it is prevented from disengagement except by the conscious act of the operator.

The steering tongue 9 is then swung downwardly, and by reason of the connection thus established between the tongue and the elevating frame, the elevating frame is pulled forwardly and upwardly to the position illustrated in Figure 5, thus raising the load, whereupon the latch 29 engages the lug 30 so as to retain the elevating frame in raised position. As will be observed, due to the universal joint connection between the steering tongue and the elevating frame, the elevating frame may be raised even when the steering tongue is operated in a vertical plane to either side of the vertical plane through the center line of the truck. Thus the truck is capable of "side" or "angle lift" operation.

After the elevating frame is raised to its uppermost position, upon slight reverse movement of the steering tongue 9, the lifting link 16 is disengaged from the ball 11 under the influence of the spring 22, for as previously explained, during the upward movement of the elevating frame the pawl 24 is released, thus permitting disengagement of the parts as soon as the lifting tension upon them is relaxed. After disengagement the truck may be moved by pulling on the steering tongue, and when it is desired to deposit the load at any given point, the latch 29 may be released by pressing the treadle 31, whereupon the elevating frame is permitted to descend.

It will be understood that the invention may be variously modified and embodied within the scope of the subjoined claims.

I claim as my invention:

1. In a lifting truck, in combination, a main frame, a swiveled steering head mounted thereon, an elevating frame, a steering and lifting tongue pivotally mounted on said steering head on an axis which intersects the axis of said steering head at right angles, a rearwardly extending lifting member on said tongue, a lifting link having a universal joint connection with said elevating frame, means under control of the operator for making a releasable connection between said lifting link and said lifting member, and means for positively locking said link and said member in said releasable connection.

2. In a lifting truck, in combination, a main frame, a swiveled steering head mounted thereon, an elevating frame, a steering and lifting tongue pivotally mounted on said steering head on an axis which intersects the axis of said steering head at right angles, a rearwardly extending lifting member on said tongue, a lifting link having a universal joint connection with said elevating frame, means under control of the operator for making a releasable connection between said lifting link and said lifting member, means for positively maintaining said releasable connection during the lifting operation, and means for releasing said last named means at the end of the lifting operation.

3. In a lifting truck, in combination, a main frame, a swiveled steering head mounted thereon, an elevating frame, a steering and lifting tongue pivotally mounted on said steering head on an axis which intersects the axis of said steering head at right angles, a rearwardly extending lifting member on said tongue, a lifting link having a universal joint connection with said elevating frame, means under control of the operator for making a connection between said lifting link and said lifting member, locking means for positively maintaining said connection, and cam operated means for releasing said locking means during lifting connection of said link and said lifting member.

4. In a lifting truck, in combination, a main frame, a swiveled steering head mounted thereon, an elevating frame, a steering and lifting tongue pivotally mounted on said steering head on an axis which intersects the axis of said steering head at right angles, a rearwardly extending lifting member on said tongue, a lifting link having a universal joint connection with said elevating frame, means under control of the operator for making a releasable connection between said lifting link and said lifting member, locking means for positively maintaining said connection during the lifting operation, means for automatically releasing said locking means, and resilient means for breaking said releasable connection after said locking means has been released.

5. In a lifting truck, in combination, a main frame, a swiveled steering head mounted thereon, an elevating frame, a steering and lifting tongue pivotally mounted on said steering head, a link having a universal joint connection to said elevating frame, means whereby said link may be operatively connected to said tongue for lifting purposes, and means operative independently of the tongue for positively maintaining said operative connection during lifting movement of the tongue.

6. In a lifting truck, in combination, a main frame, a swiveled steering head mounted thereon, a steering and lifting tongue pivotally mounted on said steering head, a link having a universal joint connection to said elevating frame, means for effective lifting connection between said link and said tongue, means for locking said link and said tongue in connective relation during the lifting operation, and means for automatically releasing said locking means at a predetermined part of said lifting operation.

7. In a lifting truck, in combination, a main frame, a swiveled steering head mounted thereon, an elevating frame, a steering and lifting tongue pivotally mounted on said steering head, a link having a universal joint connection to said elevating frame, means for effecting lifting connection between said link and said tongue, means for locking said link and said tongue in connected relation during the lifting operation, means for automatically releasing said locking means at a predetermined part of the lifting operation, means for locking the frame in raised position, and means for releasing the lifting connection between said link and said frame while the frame is locked in raised position.

8. In a lifting truck, the combination of a main frame, an elevating frame, a steering and lifting tongue on the main frame, means for releasably connecting said tongue and said elevating frame, a latch pivotally mounted on said elevating frame and having stop means to limit its movement toward and away from said main frame, and means on the main frame for engaging a portion of said latch to hold said elevating frame in raised position.

9. In a lifting truck, the combination of a main frame, a swiveled steering head mounted thereon, an elevating frame, a steering and lifting tongue pivoted on said steering head, a link having operative connection with said frame, link actuating means tending normally to retain said link out of position for operative connection to said tongue, and means for locking said link actuating means in position to permit lifting connection between said link and said tongue when the latter is in upright position.

10. In a lifting truck, the combination of a main frame, a swiveled steering head mounted thereon, an elevating frame, a steering and lifting tongue pivoted on said steering head, a link having operative connection with said frame, actuating means tending normally to retain said link out of position for operative connection with said tongue, means for locking said link actuating means in position to permit lifting connection between said link and said tongue when the latter is in upright position, and means for releasing said locking means during lifting movement of said tongue.

11. In a lifting truck, the combination of a main frame, a swiveled steering head mounted thereon, an elevating frame, a steering and lifting tongue pivoted on said steering head, a link having operative connection with said frame, link actuating means tending normally to retain said link out of position for operative connection with said tongue, means for locking said link actuating means in position to permit lifting connection between said link and said tongue when the latter is in upright position, means for releasing said locking means during lifting movement of said tongue, and means for locking said elevating frame in raised position to permit release of the lifting connection between said link and said tongue.

12. In a lifting truck, the combination of an elevating frame, a link pivotally mounted thereon, a link actuating member pivoted on said frame and having a portion adapted to engage said link, means tending normally to urge said actuating member to move a portion of said link toward the frame, a pawl mounted on said member, a detent on said frame, and means for moving said member to present said pawl in effective detent engaging position whereby said portion of said link is permitted to move away from the frame.

13. In a lifting truck, the combination of an elevating frame, a link pivotally mounted thereon, a link actuating member pivoted on said frame and having a portion adapted to engage said link, means tending normally to urge said actuating member to move said link in one direction, and means to lock said member in a predetermined position to permit movement of the link in the opposite direction.

14. In a lifting truck, the combination of an elevating frame, a link pivotally mounted thereon, a link actuating member pivoted on said frame and having a portion adapted to engage said link, means tending normally to urge said actuating member to move said link in one direction, and means cooperating with said frame to lock said member in a predetermined position to permit movement of the link in the opposite direction.

15. A lifting truck comprising, in combination, a main frame, an elevating frame mounted on the main frame and movable upwardly relatively thereto, an operating member operatively associated with said elevating frame, a swinging lever carried by said main frame, inter-engaging means carried by said lever and said operating member whereby movement of said lever acts to raise said elevating frame relatively to said main frame, said inter-engaging means being arranged so that the lifting tension tends to maintain the same in engagement, and additional means tending independently to maintain said means in engagement.

16. A lifting truck comprising, in combination, a main frame, an elevating frame mounted on the main frame and movable upwardly relatively thereto, a swinging lever carried by said main frame, inter-engaging means connecting said lever and said elevating frame whereby movement of said lever acts to raise said elevating frame relatively to said main frame, said inter-engaging means being arranged so that the lifting tension tends to maintain the same in engagement, and additional means tending independently to maintain said means in engagement.

17. A lifting truck comprising, in combination, a main frame, an elevating frame mounted on the main frame and movable upwardly relatively thereto, a swinging lever carried by said main frame, inter-engaging means carried by said lever and said elevating frame whereby movement of said lever tends to raise said elevating frame relatively to said main frame, said inter-engaging means being arranged so that the lifting tension tends to maintain the same in engagement, and additional means independent of the lever and its mounting adapted to maintain said inter-engaging means in engagement.

18. A lifting truck comprising, in combination, a main frame, an elevating frame mounted on the main frame and movable upwardly relatively thereto, a swinging lever, inter-engaging means on said lever and elevating frame whereby said frame may be elevated, means additional to said inter-engaging means and said lever and mounted so as to maintain said means in engagement, said additional means being movable to an inoperative position when said elevating frame has been lifted a predetermined extent.

19. In a lifting truck, in combination, a main frame, a lifting frame, a lifting tongue on said main frame, a lifting member on said truck operable by said tongue to elevate said lifting frame, and detent means operable upon engagement of said lifting member and tongue to maintain them in continued engagement during elevating movement.

20. In a lifting truck, in combination, a main frame, a lifting frame, a lifting tongue on said main frame, a lifting member on said truck operable by said tongue to elevate said lifting frame, said lifting member being movable into engagement with said tongue, and means operable to be positioned during this engaging movement to maintain said tongue and member in continued engagement during the elevating movement.

21. In a lifting truck, in combination, a main frame, a lifting frame, a lifting tongue on said main frame, a lifting member on said truck operable by said tongue to elevate said lifting frame, said lifting member being movable into engagement with said tongue, and means carried by said member and movable into position to maintain said tongue and member in continued engagement during the elevating movement.

22. In a lifting truck, in combination, a main frame, a lifting frame, a steering and lifting tongue on said main frame, a lifting link on said lifting frame adapted to be engaged by said tongue whereby movement of the tongue will elevate said lifting frame, and detent means operable upon engagement of said link and tongue to maintain them in continued engagement.

23. In a lifting truck, in combination, a main frame, a lifting frame, a steering and lifting tongue on said main frame, a lifting link on said lifting frame adapted to be engaged by said tongue whereby movement of the tongue will elevate said lifting frame, and detent means adapted to be so positioned upon engagement of said link and tongue as to maintain said link and tongue in continued engagement during the lifting movement of the lifting frame.

24. In a lifting truck, in combination, a main frame, a swivelled steering head mounted on said main frame, an elevating frame mounted for forward and upward movement with respect to said main frame, a steering and lifting tongue pivotally mounted on said steering head, a lifting link directly secured to said elevating frame whereby pulling movement on said link will move said elevating frame forwardly and upwardly, said link being universally mounted relatively to said elevating frame and having a portion extending into a position to be engaged by the lifting tongue in any of its usual steering positions.

In testimony whereof, I have signed my name to this specification this 21st day of August, 1928.

WILLIAM STUEBING, Jr.